(12) United States Patent
Forbes et al.

(10) Patent No.: US 11,132,842 B2
(45) Date of Patent: Sep. 28, 2021

(54) METHOD AND SYSTEM FOR SYNCHRONIZING A PLURALITY OF AUGMENTED REALITY DEVICES TO A VIRTUAL REALITY DEVICE

(71) Applicant: Unity IPR ApS, Copenhagen K (DK)

(72) Inventors: Jonathan Manzer Forbes, San Francisco, CA (US); Timoni West, San Francisco, CA (US); Jimmy Chacko Alamparambil, San Francisco, CA (US)

(73) Assignee: Unity IPR ApS, Copenhagen (DK)

( * ) Notice: Subject to any disclaimer, the term of this patent is extended or adjusted under 35 U.S.C. 154(b) by 7 days.

(21) Appl. No.: 16/231,064

(22) Filed: Dec. 21, 2018

(65) Prior Publication Data

US 2019/0197788 A1 Jun. 27, 2019

Related U.S. Application Data

(60) Provisional application No. 62/610,019, filed on Dec. 22, 2017.

(51) Int. Cl.
*G06T 19/00* (2011.01)
*G06T 15/00* (2011.01)
*G06F 3/03* (2006.01)
*G06F 3/0346* (2013.01)
*G06F 3/01* (2006.01)
*G06F 1/16* (2006.01)

(52) U.S. Cl.
CPC ............ *G06T 19/006* (2013.01); *G06F 1/163* (2013.01); *G06F 3/011* (2013.01); *G06F 3/0304* (2013.01); *G06F 3/0346* (2013.01); *G06T 15/005* (2013.01); *G06T 2219/024* (2013.01)

(58) Field of Classification Search
CPC ........ G06F 1/163; G06F 3/011; G06F 3/0304; G06F 3/0346; G06T 15/005; G06T 19/006; G06T 2219/024
See application file for complete search history.

(56) References Cited

U.S. PATENT DOCUMENTS

| 9,600,929 | B1* | 3/2017 | Young | G06T 1/60 |
|---|---|---|---|---|
| 2011/0157264 | A1* | 6/2011 | Seshadri | H04N 13/383 |
| | | | | 345/698 |
| 2016/0047669 | A1* | 2/2016 | Delaye | G06F 16/29 |
| | | | | 701/533 |
| 2017/0076499 | A1* | 3/2017 | Jiang | G06T 19/006 |
| 2017/0209786 | A1* | 7/2017 | Zhu | A63F 13/92 |

* cited by examiner

*Primary Examiner* — Ming Wu
(74) *Attorney, Agent, or Firm* — Schwegman Lundberg & Woessner, P.A.

(57) ABSTRACT

A method of synchronizing digital content between a first mobile device and a second mobile device is disclosed. Device position and orientation data is received at a first application executing in an operating system of the first mobile device. Sensor data is used to determine at least two 3D points associated with a physical location of the second mobile device. At least two 3D points are used to determine an offset for the position, orientation and scale of the first mobile device relative to the second mobile device. The offset and digital content data captured by the first mobile device are shared over a network with a second application executing in an operating system of the second mobile device. The second mobile device uses the offset to display the digital content captured by the first mobile device together with digital content data captured by the second mobile device.

22 Claims, 9 Drawing Sheets

METHOD AND SYSTEM FOR SYNCHRONIZING A PLURALITY OF AUGMENTED REALITY DEVICES TO A VIRTUAL REALITY DEVICE

CROSS REFERENCE TO RELATED APPLICATIONS

This application claims the benefit of U.S. Provisional Application No. 62/610,019, filed Dec. 22, 2017, entitled "METHOD AND SYSTEM FOR SYNCHRONIZING A PLURALITY OF AUGMENTED REALITY DEVICES TO A VIRTUAL REALITY DEVICE," which is incorporated by reference herein in its entirety.

TECHNICAL FIELD

The present invention relates to the field of tools and techniques for viewing and manipulating virtual objects in virtual reality and augmented reality.

BACKGROUND OF THE INVENTION

In the combined world of augmented reality and virtual reality (e.g., mixed reality (MR)) there is a need for augmented reality (AR) devices and virtual reality (VR) devices to interact and share data. One situation involving such interaction is the capture of MR video wherein live real-world video/content is mixed or composited with virtual objects. Interaction of AR device types with VR device types is often difficult because the two types of devices must share a common coordinate system in order for an object to appear in the correct position for both types of devices. For example, existing MR video capture with an external camera often uses a controller or tracker attached to a real camera so that a system controlling the MR device can simultaneously track both the camera and the MR device in the same tracking space as the rest of the VR hardware. However, in such a system, the MR device is not tracking the actual camera, but rather it is tracking the extra controller attached to the camera. Furthermore, in this MR video generation scenario, a user in a VR session must be filmed using a green screen and/or depth camera so that the footage is composited with virtual objects from the VR session which are aligned with the tracking information from the extra controller. Similarly, the real camera does not know anything about the virtual environment.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
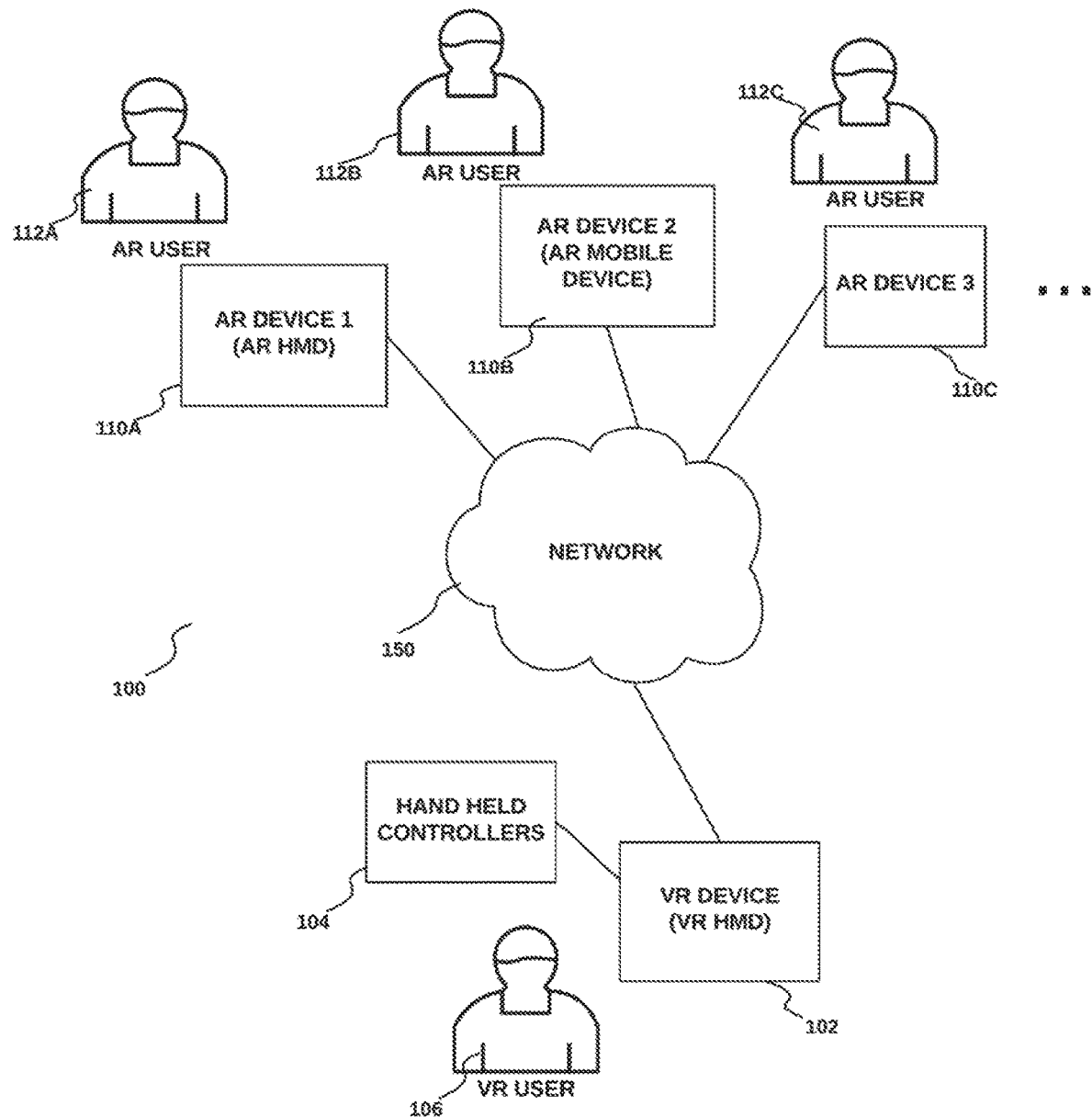
FIG. 1 is a schematic illustrating a MR window system, in accordance with one embodiment.

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Throughout the description herein, the term MR environment (or simply mixed reality) should be understood to include all combined environments in the spectrum between reality and virtual reality including virtual reality, augmented reality and augmented virtuality. Also, a mixed reality device includes both augmented reality devices and virtual reality devices. However, in certain parts of the description the terms virtual reality device (VR device) and augmented reality device (AR device) will specifically be used to draw attention to the differences between the two.

A MR window system and associated methods are described herein. In many embodiments, the MR window system is configured to use AR devices (e.g., smartphones or AR head mounted displays) as windows into a networked VR session wherein the session includes one or more VR devices, and wherein tracking spaces (e.g., coordinate systems) for all devices are aligned. The system can be used to create real-time MR video using one of the AR devices or VR devices, and to feed environment data and "real-world input" from one or more of the AR devices to one or more of the VR devices.

In an example embodiment, a user (e.g., a wearer of an HMD, or someone holding a smartphone, tablet, or other MR-capable device) experiences an MR environment as presented by the MR window system via an MR device. In particular, for an AR device, the MR environment includes a view of the real world (e.g., the environment surrounding the device) that includes virtual content provided by the MR window system. The AR device, in some embodiments, includes a forward-facing camera configured to capture digital video or images of the real world around the device, optionally including depth data, which the MR window system may analyze to provide some of the MR window system features described herein. In particular, for a VR device, the MR environment includes a view of a virtual world along with some real-world content (e.g., video) provided by the MR window system and which originates from an AR device.

In example embodiments, a method of synchronizing digital content between a first mobile device and a second mobile device is disclosed. Device position and orientation data is received, via an application executing within an operating system of the first mobile device, from an operating system of the first mobile device and a first set of sensors of the first mobile device. Sensor data from the operating system of the first mobile device is used to determine at least two 3D points associated with a physical location of the second mobile device. At least two 3D points are used to determine an offset for the position, orientation and scale of the first mobile device relative to the second mobile device. The offset and digital content data captured by the first mobile device are shared over a network with a second application executing in an operating system of the second mobile device. The second mobile device is configured to use the offset to display the digital content captured by the first mobile device together with digital content data captured by the second mobile device on a device display of the second mobile device.

In example embodiments, one or more hardware processors of the first mobile device are configured to perform the operations for synchronizing the digital content by a first MR window module that is included the first mobile-device memory. In example embodiments, one or more hardware processors of the second mobile device are configured to use the offset to display the digital content by inclusion of a second MR window module in the second mobile-device memory.

The present disclosure includes apparatuses which perform the methods and operations disclosed herein, including data processing systems which perform these methods and operations and computer readable media which when executed on data processing systems cause the systems to perform these methods, or operations, or combinations of operations including non-routine and unconventional operations.

In accordance with an embodiment, and shown in FIG. 1 is a diagram of an example MR window system 100 and associated devices configured to provide MR window system functionality. In the example embodiment, the MR window system 100 includes one VR device 102 operated by a VR user 106, and one or more AR devices 110A-C (or collectively AR devices 110) with each operated by an AR user 112A-C (or collectively AR users 112). The AR devices 110A-C and VR device 102 are coupled in networked communication via a network 150 (e.g., a cellular network, a Wi-Fi network, the Internet, and so forth).

Figure 2A:
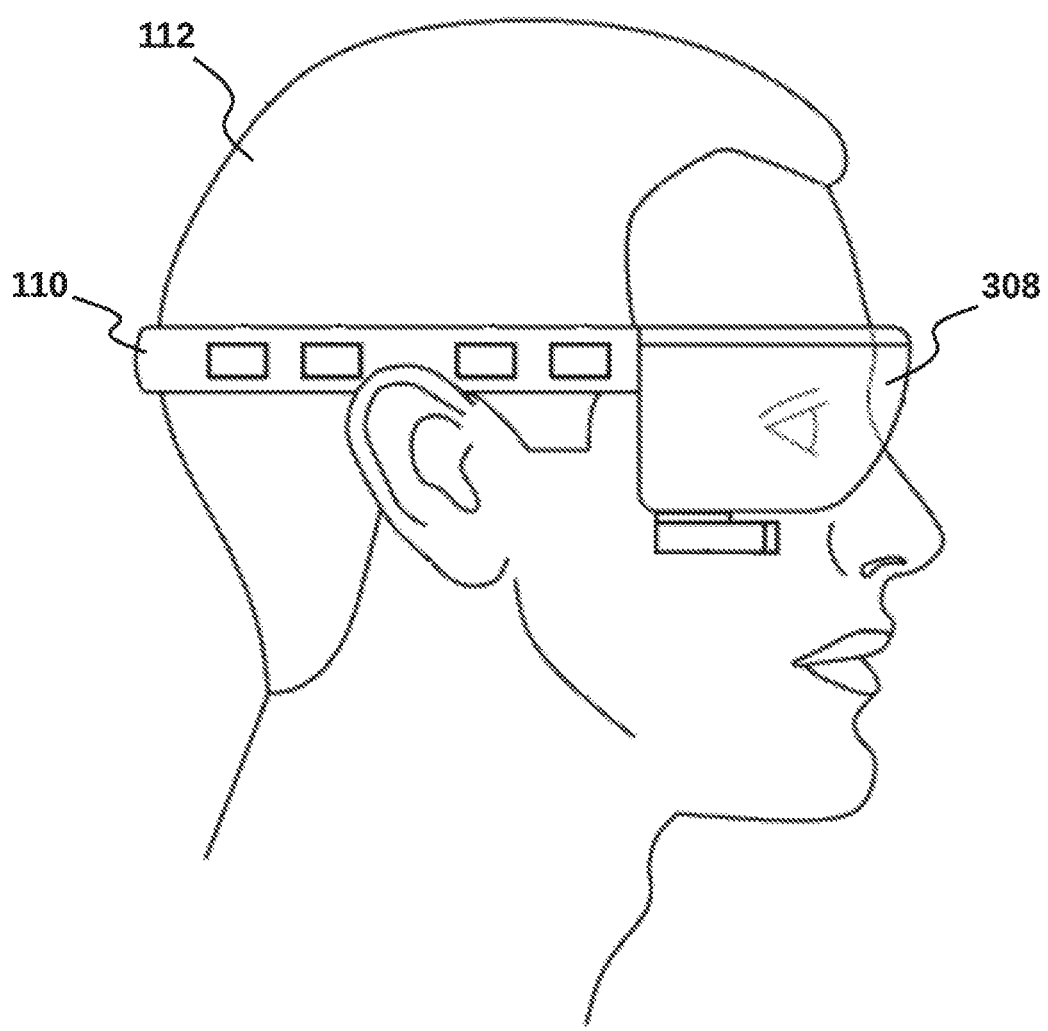
FIG. 2A is a schematic illustrating an augmented reality head mounted display (HMD), in accordance with one embodiment.

In accordance with an embodiment, the AR device 110 is a computing device capable of providing an augmented reality experience to the AR user 112. In some embodiments and as shown in FIG. 2A, the AR device 110 is a head-mounted display (HMD) device worn by the AR user 112 which includes a partially see-through display 308 which can be configured to display digital objects on top of a real-world view (e.g., Google Glass®, Microsoft HoloLens®, Meta™ and so forth). In other embodiments, the AR device 110 is a mobile computing device, such as a smartphone or a tablet computer.

Figure 2B:
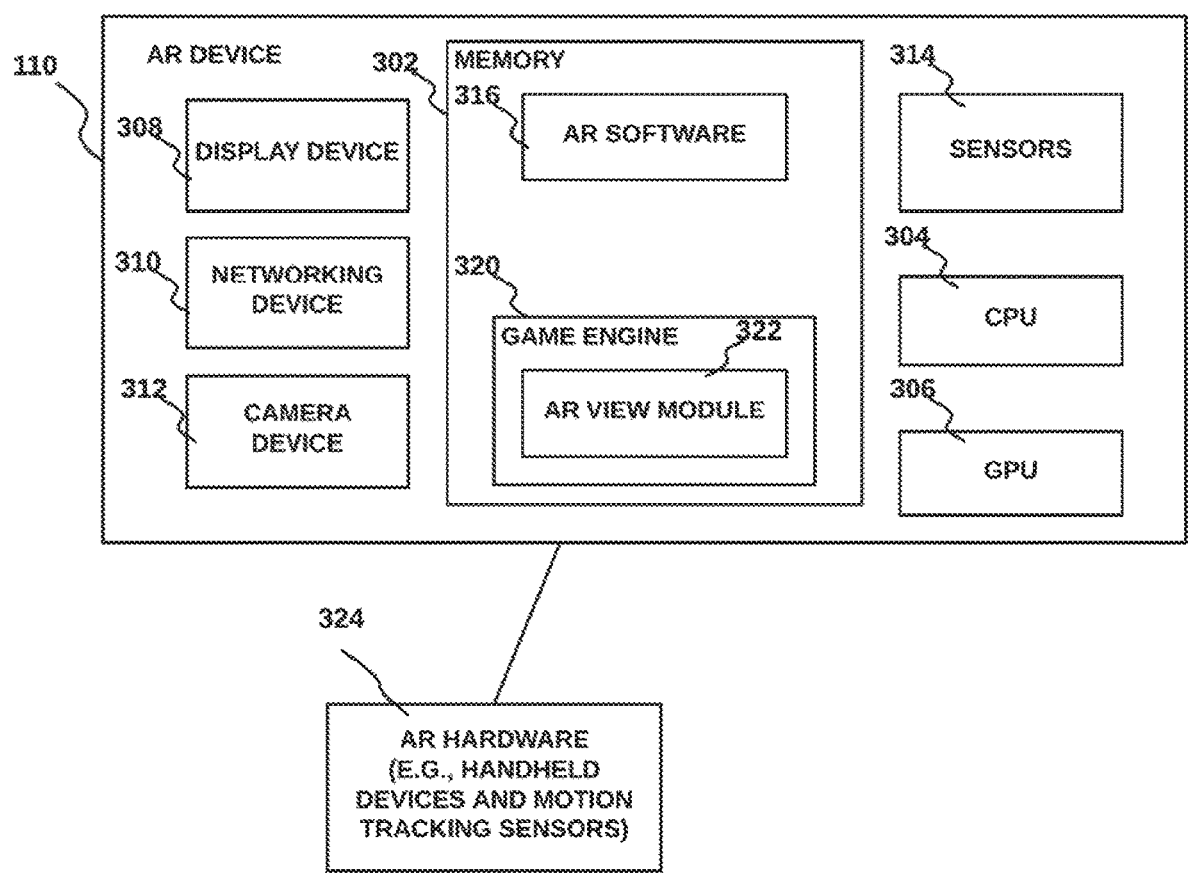
FIG. 2B is a schematic illustrating an augmented reality device, in accordance with one embodiment.

In the example embodiment, and as shown in FIG. 2B, the AR device 110 includes one or more central processing units (CPUs) 304, and graphics processing units (GPUs) 306. The AR device 110 also includes one or more networking devices 310 (e.g., wired or wireless network adapters) for communicating across the network 150. The AR device 110 further includes one or more camera devices 312 which may be configured to capture digital video of the real world near the AR device 110 during operation. The camera device 312 may include a depth sensor for capturing depth information within the surrounding environment of the device 110. The AR device 110 may also include one or more sensors 314, such as a global positioning system (GPS) receiver (e.g., for determining a GPS location of the AR device 110), biometric sensors (e.g., for capturing biometric data of the AR user 112), motion or position sensors (e.g., for capturing position data of the AR user 112 or other objects), and an audio microphone (e.g., for capturing sound data). Some sensors 314 may be external to the AR device 110, and may be configured to wirelessly communicate with the AR device 110 (e.g., such as used in the Microsoft Kinect®, Hololens controller, MIT's Lidar sensor, or MIT's wireless emotion detector).

The AR device 110 also includes one or more input devices 324 such as, for example, a keyboard or keypad, mouse, pointing device, touchscreen, or handheld device (e.g., hand motion tracking device, handheld controller, handheld pointer) or external position tracking system. In accordance with an embodiment, the input devices 324 may be integrated directly within the AR device 110. The AR device 110 further includes one or more display devices 308, such as a touchscreen of a tablet or smartphone, or lenses or visor of a AR HMD, which may be configured to display virtual objects to the AR user 112 in conjunction with a real-world view.

Figure 3A:
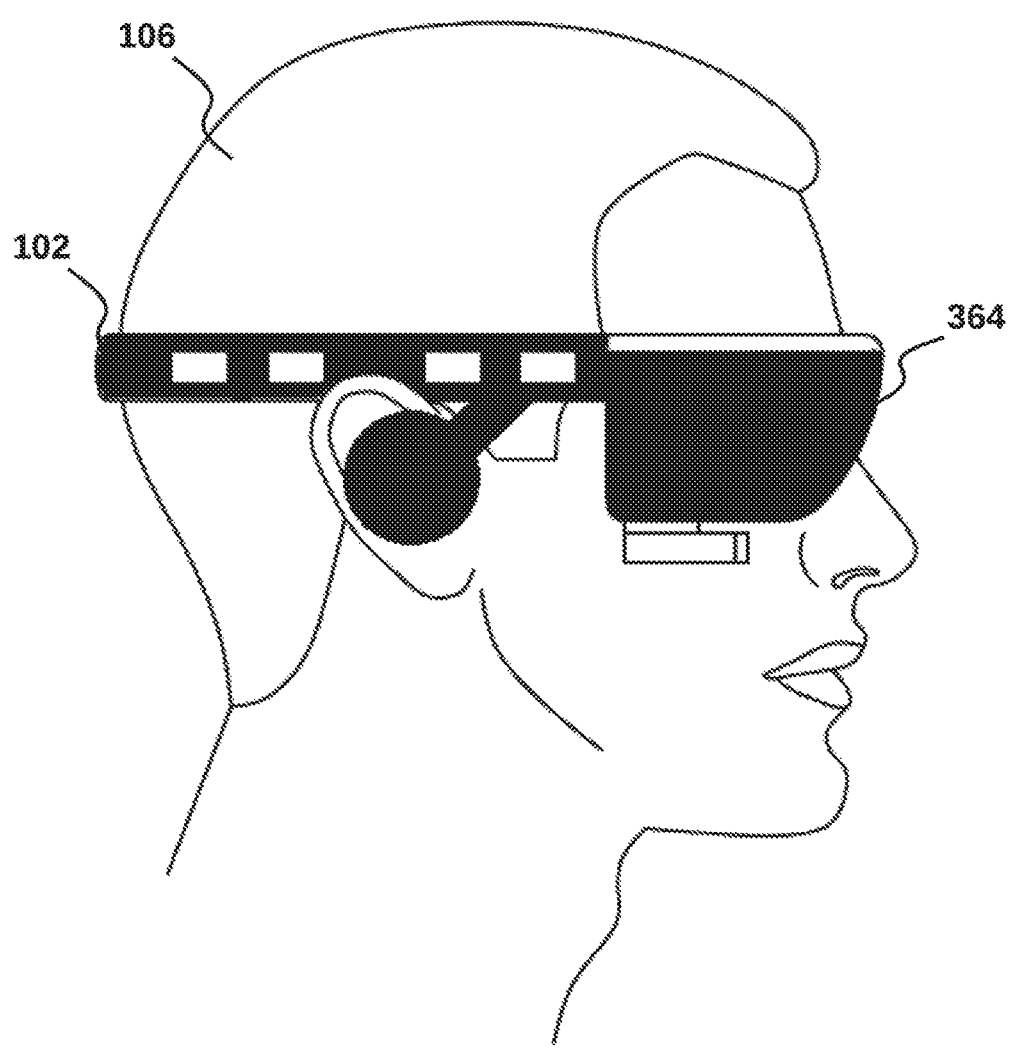
FIG. 3A is a schematic illustrating a virtual reality HMD, in accordance with one embodiment.

In accordance with an embodiment, the VR device 102 is a computing device capable of providing a virtual reality experience to the VR user 106. In some embodiments and as shown in FIG. 3A, the VR device 102 is a head-mounted display (HMD) device worn by the VR user 106 which includes an opaque display 364 capable of displaying a virtual environment to the user (e.g., HTC Vive®, Oculus Rift®, and the like). In other embodiments, the VR device 102 is a mobile computing device, such as a smartphone or a tablet computer.

Figure 3B:
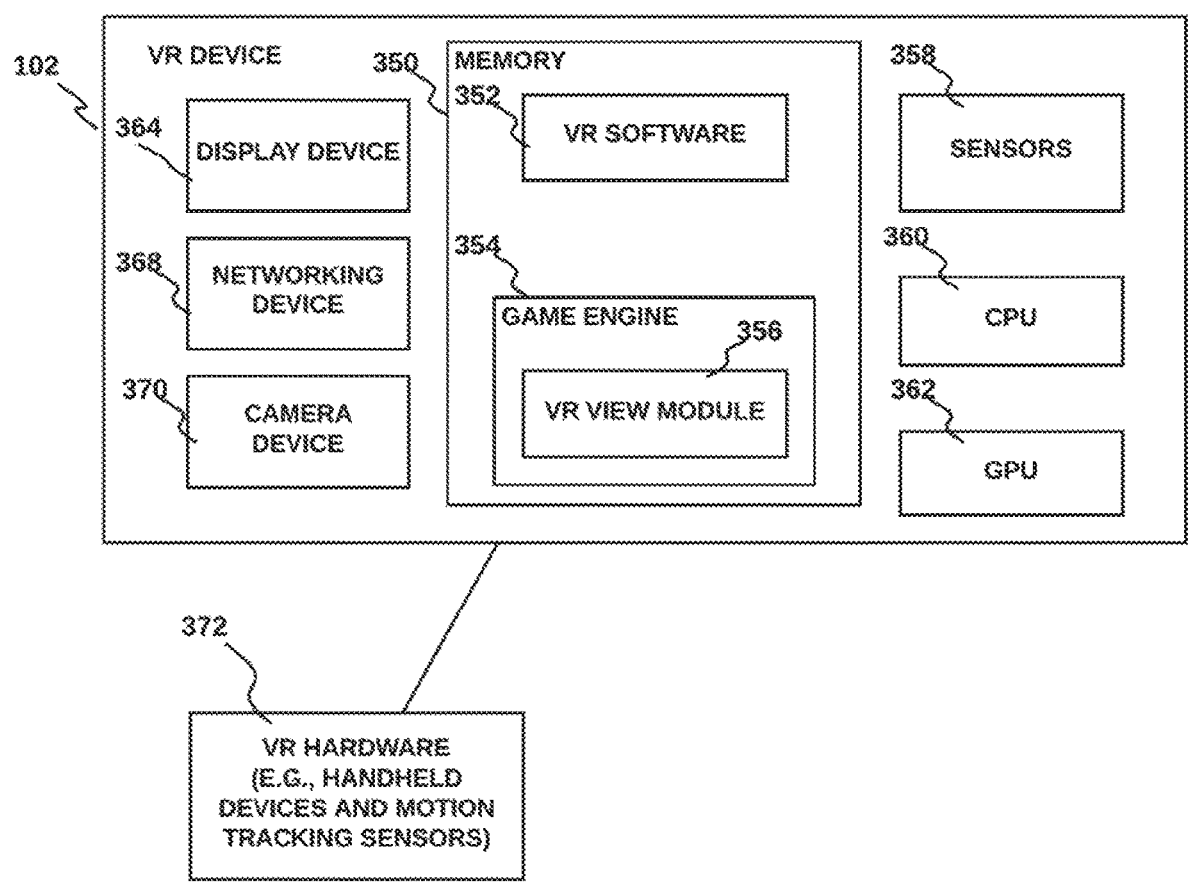
FIG. 3B is a schematic illustrating a virtual reality device, in accordance with one embodiment.

In the example embodiment, and as shown in FIG. 3B, the VR device 102 includes one or more central processing units (CPUs) 360, and graphics processing units (GPUs) 362. The VR device 102 also includes one or more networking devices 368 (e.g., wired or wireless network adapters) for communicating across the network 150. The VR device 102 further includes one or more camera devices 370 which may be configured to capture digital video of the real world near the VR device 102 during operation. The VR device 102 may also include one or more sensors 358, such as a global positioning system (GPS) receiver (e.g., for determining a GPS location of the VR device 102), biometric sensors (e.g., for capturing biometric data of the VR user 106), motion or position sensors (e.g., for capturing position data of the VR user 106 or other objects), and an audio microphone (e.g., for capturing sound data). Some sensors 358 may be external to the VR device 102, and may be configured to wirelessly communicate with the VR device 102 (e.g., such as used in the Microsoft Kinect®, HTC Vive controllers, MIT's Lidar sensor, or MIT's wireless emotion detector).

The VR device 102 also includes one or more input devices 372 such as, for example, a keyboard or keypad, mouse, pointing device, touchscreen, or hand-held device (e.g., hand motion tracking device, handheld controller, handheld pointer) or external position tracking system. In accordance with an embodiment, the input devices 372 may be integrated directly within the AR device 110. The VR device 102 further includes one or more display devices 364, such as a touchscreen of a tablet or smartphone, or lenses or visor of a VR HMD, which may be configured to display real objects to the VR user 106 in conjunction with a virtual environment view.

Referring back to FIG. 2B, the memory 302 in the AR device 110 is configured to store AR software 316 in order to present AR functionality to the AR user 112. The memory 302 in the AR device 110 is also configured to store a game engine 320 that contains an AR view module ("AR module") 322. Referring to FIG. 3B, the memory 350 in the VR device 102 is configured to store VR software 352 in order to present VR functionality to the VR user 106. The memory 350 in the VR device 102 is also configured to store a game engine 354 that contains a VR view module ("VR module") 356. During operation, the AR view module 322 and the VR view module 356 perform the various MR window functionalities described herein. More specifically, in some embodiments, some functionality may be implemented within the AR module 322 and other functionality may be implemented within the VR module 356.

Figure 4:
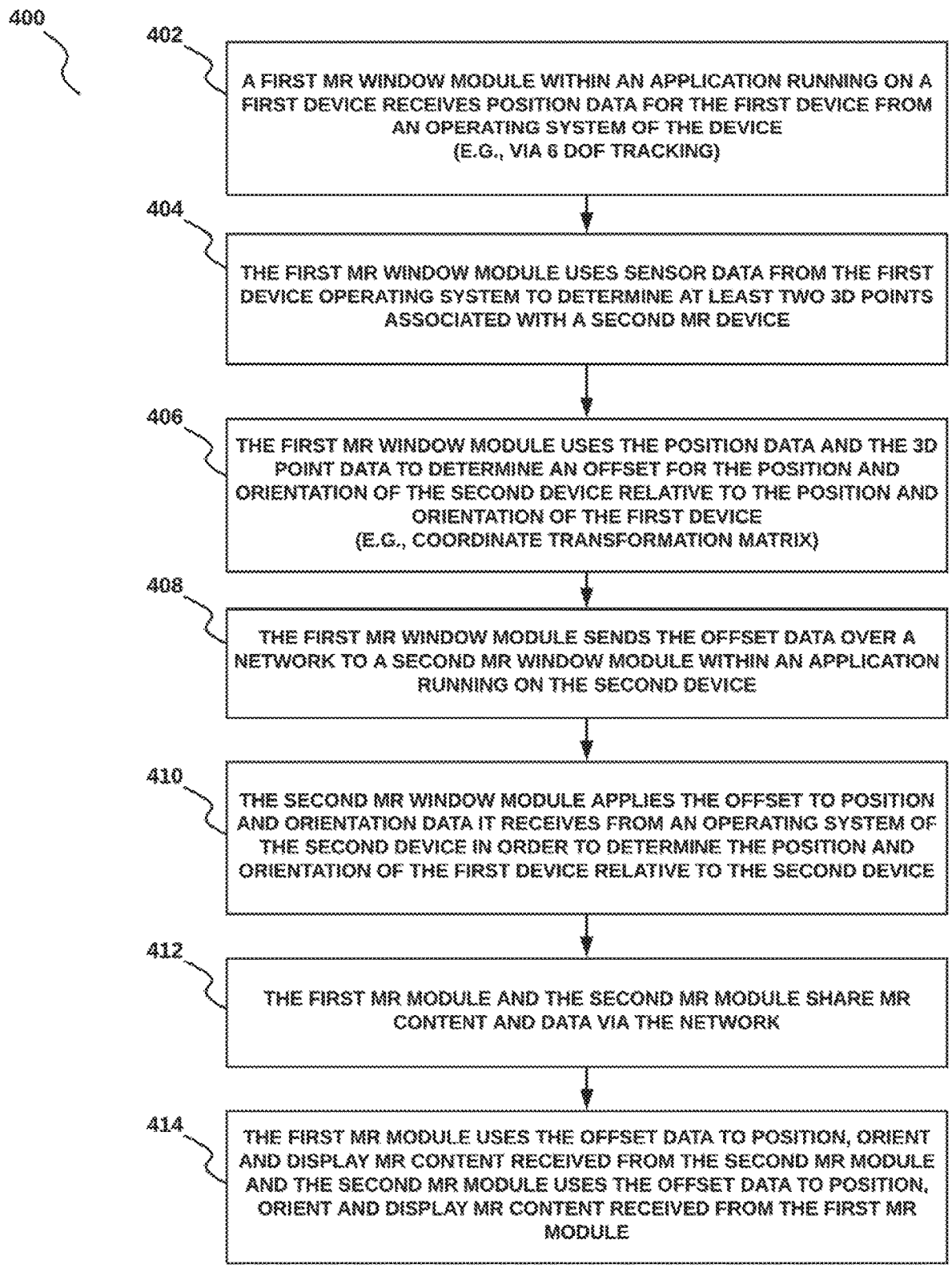
FIG. 4 is a flowchart illustrating a method for synchronizing a first mixed reality device to a second mixed reality device, in accordance with one embodiment.

In accordance with an embodiment and shown in FIG. 4 is a method 400 for synchronizing an AR session with a VR session. In the method 400, the VR module 356, executing on the VR device 102 (e.g., an HMD), may be configured to act as a network host, and allow one or more AR modules 322 (e.g., AR devices 110) to connect as clients. In accordance with an embodiment, during process 402 a first MR window module (e.g., the AR module 322) within an application (e.g., the game engine 354) running on a first device receives position data (and possibly orientation data) for the first device from an operating system of the device. The position and orientation data may come from a position tracking system such as a 6 degree of freedom (DoF) tracking system. A 6 DoF tracking system may include external optical tracking, and inside-out tracking with external references, or pure inside-out optical tracking. As part of process 404, the first MR window module uses sensor data from the first device operating system to determine at least two 3D points associated with a second MR device. The second MR device may be in close proximity to the first MR device. The sensor data can come from any sensor 314 on the first device. For example, the sensor data can include camera data (e.g., RGB or RGB-depth) and data from a hand-held sensor. The at least two 3D points are associated with the second MR device. For example, the at least two 3D points can correspond to a physical point on the second device and any tracked accessory (e.g., a tracked handheld device). In accordance with an embodiment, the at least two 3D points are determined manually with a user touching two parts of the second device with a tracked device (e.g., tracked handheld device). For example, the user could touch two locations on the second device, the first location including the surface of the VR device 102 (e.g., HMD) and the second location including the surface of the VR device controller 372 (e.g., the hand controller).

In accordance with an embodiment, the at least two 3D points are determined with computer vision by analyzing video from the first MR device camera 312. The analyzing of the video extracts a plurality of points on the VR device 102 in order to determine the position and orientation of the device 102.

In accordance with an embodiment, in process 406 the first MR window module uses the position data and the 3D point data to determine an offset for the position and orientation of the second device relative to the position and orientation of the first device. The offset may be in the form of a coordinate transformation matrix which can be used to convert coordinates from the first device into coordinates for the second device (and/or convert coordinates from the second device into coordinates for the first device). In accordance with an embodiment, during process 408, the first MR window module sends the offset data over the network 150 to a second MR window module within an application running on the second device. In accordance with an embodiment, at process 410 the second MR window module applies the offset to position and orientation data it receives from an operating system of the second device in order to determine the position and orientation of the first device relative to the second device.

In accordance with an embodiment, at process 412, the first MR module and the second MR module share MR content and data via the network 150. The MR content includes digital content and data to describe the digital content; including 3D digital models and any data associated with a 3D digital model such as rigging data, texture data, animation data, physics data, and the like. The MR content may include partially or fully rendered digital content. The data shared includes sensor data regarding a real-world environment around an MR device, including real-world object position and movement, virtual object position and movement, and state information. In many embodiments, the AR view module 322 is configured to send real-world environment data from the AR device 110 to the VR device 102; including data on real surfaces, SLAM-generated meshes, and point clouds captured by the AR device 110. The real-world data can be obtained from the sensors 314 (e.g., depth sensor) and camera device 312 on the AR device 110 and can be processed (e.g., using object recognition algorithms, mesh creation algorithms, smoothing algorithms, etc.) on the AR device 110 prior to syncing with the VR device 102.

In accordance with an embodiment, at process 414, the first MR module uses the offset data to position, orient, scale and display MR content received from the second MR module. The displaying may include directly rendering (e.g., to the MR display device) digital objects within the MR content, received via the network connection. Similarly, the second MR module uses the offset data to position, orient, scale and display MR content received from the first MR module.

In accordance with an embodiment, and as an example of process 414, an AR device 110 can display, to the AR user, elements (e.g., MR content) of a VR environment generated from a VR device 102 in correct spatial alignment with the VR device 102 (e.g., so that an element is displayed for the AR user in a real-world location, orientation and scale that matches the location, orientation and scale of the element as it would appear to the VR user within the VR environment) even though the AR device 110 is not tracked directly by the VR system at the system layer (e.g., using software such as SteamVR, Oculus, ARKit, ARCore and the like which are integrated with the operating system of their respective devices). The offset data is used to make the AR system layer tracking appear to line up with the VR system layer tracking. The offset data as calculated in process 406 allows the AR device 110 and the VR device 102 to be synchronized in spatial tracking without the system layer on the AR device receiving information regarding the VR device 102 (e.g., location, orientation, and scale data) and the system layer on the VR device 102 receiving information regarding the AR device 110 location, orientation and scale. Using the method 400, an AR user on an AR device 110 can observe (via the AR device display 308) content from a VR session on a VR device 102 and see select virtual objects (e.g., defined by a developer) aligned with the VR user 106. As an example, if a VR user 106 is holding a virtual burrito, an AR user 112 can see the burrito aligned correctly in the VR user's 106 hand as the hand is moving.

In accordance with an embodiment, as an example of the method 400, when a plurality of AR devices are present and one VR device is present, the AR view module 322 executing on one of the plurality of AR devices 110 can share and synchronize AR session content including real-world data (e.g., raw or processed data from sensors) and AR digital content with the VR view module 356 on the VR device 102, which then synchronizes the AR session content with other AR devices 110 from the plurality of AR devices. The VR device 102 synchronizes the shared data into the VR environment using the offset data. As an example, the VR device 102 or one of the plurality of AR devices 110 can use the shared data to calibrate virtual objects (e.g., from the AR session content) onto real surfaces (e.g., to align a virtual table with a real-world table or to align a user interface panel with a real-world wall). As another example, the VR device 102 can use the shared AR session content data to create dynamic safety (e.g., chaperone) boundaries that allow the VR user 106 to see objects within the VR device (or parts of objects or features of objects) of a surrounding real-world environment and how they appear, move and change in real-time.

In accordance with an embodiment, as an example of the method 400, the AR view module 322 can be configured to create annotations which originate from the AR device 110 but which are visible within the VR environment of the VR device. For example, an AR user 112 using an AR device 110 (or a handheld device 324) can mark a position or an object in the real world (e.g., using a hand gesture with a handheld device) that is displayed with a virtual marker (e.g., a virtual object) in the virtual environment by the VR device 102 so that it can be seen by the VR user 106 via their display device 364. The AR user 112 could for example use the AR device 110 (e.g., the handheld controllers 324) to mark a series of specific locations in the real world guiding a VR user 106 through a VR experience.

In accordance with an embodiment, as an example of the method 400, the sharing of MR content and data (e.g., within process 412) from a first AR device 110 to a VR device 102, and then to a second AR device 110 (or more AR devices 110) is done during a video game session synchronized between the devices. For example, an AR user 112 participating in the game can place one or more digital gameplay objects (e.g., using an AR device 110) into the virtual environment of the game which can be seen and interacted with by the VR user 106 via the VR device 102. Similarly, the AR user 112 can control a character which is seen both in the real-world via the AR device 110 and in the virtual environment seen by the VR user 106 with the VR device 102.

In accordance with many embodiments, as part of process 412 of the method 400, only select MR content and data is synchronized from the first MR device (e.g., AR device 110) to the second MR device (e.g., VR device 102). For example, consider an embodiment wherein the first MR device is an AR device 110 and the second MR device is a VR device 102. In the example embodiment, the AR device 110 would use sensors 314 to scan a real-world environment and only send a portion of the scanned data to the VR device 102. In many embodiments, the portion of data sent to the VR device 102 corresponds to real world objects selected by the AR user 112 via the AR device 110. For example, the AR user 112 might select an object in the real-world environment (e.g., that were previously scanned by the sensors 314) by touching the object or by otherwise selecting the object with a pointing device or method (e.g., using a handheld device as a pointing wand or using other hand tracking technology). The AR user 112 could walk through the real-world environment and select objects to share with the VR user 106 (e.g., via the VR device 102).

In accordance with many embodiments, as part of process 412 of the method 400, the MR window system is configured to feed the first MR device camera data into the second MR device. For example, consider an example embodiment wherein the first MR device is an AR device 110 and the second MR device is a VR device 102. The VR device 102 uses the AR device 110 position and camera feed to display a real-time virtual representation of the AR device 110 (e.g., HMD or mobile phone) with the camera feed data from the AR device 110 fed onto the virtual representation of the AR device 110. For example, if the AR user 112 is holding a smartphone, the representation of the phone in the virtual scene can display a real-time video feed of the front-facing camera feed (e.g., to show the AR user's 112 real face in the VR environment).

Figure 5:
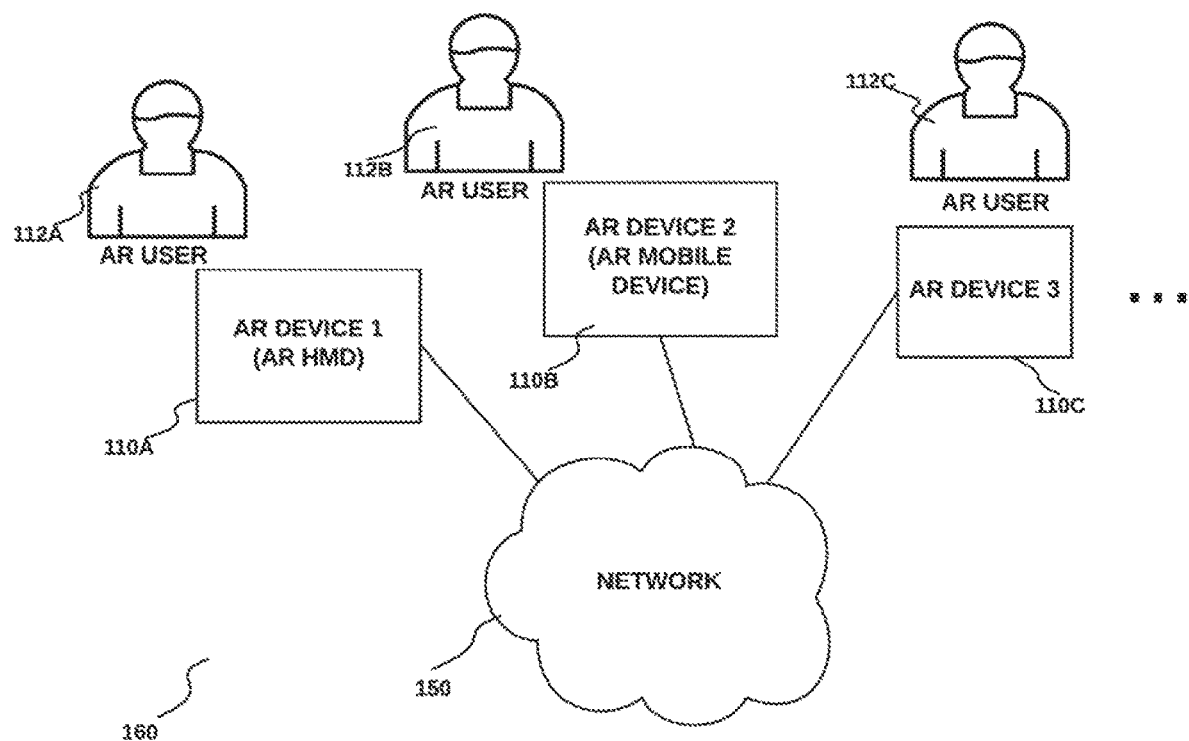
FIG. 5 is a schematic illustrating a MR window system, in accordance with one embodiment.

In accordance with an embodiment, FIG. 5 is a diagram of an example alternate MR window system 160 and associated devices configured to provide MR window system functionality. In the example embodiment, the alternate MR system 160 is similar to the MR system 100 shown in FIG. 1 without a VR device. In the example embodiment, the alternate MR window system 160 includes one or more AR devices 110A-C operated by an AR user 112A-C coupled in networked communication via the network 150.

In accordance with an embodiment, as part of process 404 of the method 400 for the alternate MR window system 160, a first AR user 112A, using a first AR device 110A marks two positions, the two positions including a first 3D point and a second 3D point in a real-world environment surrounding the AR device 110A. A position in the real-world can represent a specific location chosen by the first AR user 112A, including any point in his surroundings that might easily be determined by a second user with a second device (e.g., a corner of a desk, a light switch, a door knob, or the like). The accuracy of the offset improves with the decreasing physical size of the point chosen. The two positions can be chosen by the user 112 with a hand tracking device which determines the position of a hand. In accordance with another embodiment, the two positions are chosen by selecting (e.g., tapping) two points on the AR device 110A display screen (e.g., a first (x,y) point and a second (x,y) point) and projecting a ray for each of the tapped points into the AR device camera view until the ray intersects an object or feature point (whose real-world position is determined by video analysis of the scene or via a depth sensor). Continuing with process 404 of the alternate MR window system 160, a second AR user 112B on a second AR device 110B selects the same two positions selected by the first user 112A on the first AR device 110A. The specific location of the two real-world points communicated between the first user and the second user (e.g., by oral means, or by the second user observing the first user, or by the first user sending a note to the second user via the application). The two positions selected by the first AR device 110A align with the two positions selected by the second AR device 110B since they represent the same two points in the real-world. The first AR device 110A sends coordinates (e.g., coordinates with respect to its own coordinate system) for the two positions, as well as the coordinates for the AR device 110A itself to the second AR device 110B. The second AR device 110B determines a coordinate transform (e.g., which can be applied on its coordinate system) to align the two positions selected via the second AR device 110B with the two positions selected via the first AR device 110A. In accordance with an embodiment, the scale between the coordinate system from the first AR device 110A and the coordinate system from the second AR device 110B is not adjusted with the coordinate transform since both devices are AR devices which have real-world scale.

In accordance with another embodiment, the calibration between two AR devices 110 is achieved using a real-world object whose orientation can be determined from its shape or whose shape and size is known a priori (e.g., a known target). In the example embodiment, an object is selected by a first AR device 110A and a second AR device 110B. The first AR device 110A and the second AR device 110B share data over the network 150 wherein the data includes the position and orientation for the object as well as device position data. The device position data is determined by the OS and received by the AR module 322 while the position and orientation of the object is determined by the AR module 322. Using the shared data, the second AR device 110B determines a coordinate transform (e.g., which can be applied to its coordinate system) to align the object as seen from the first AR device 110A (e.g., with respect to the coordinate system of the first AR device 110A).

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
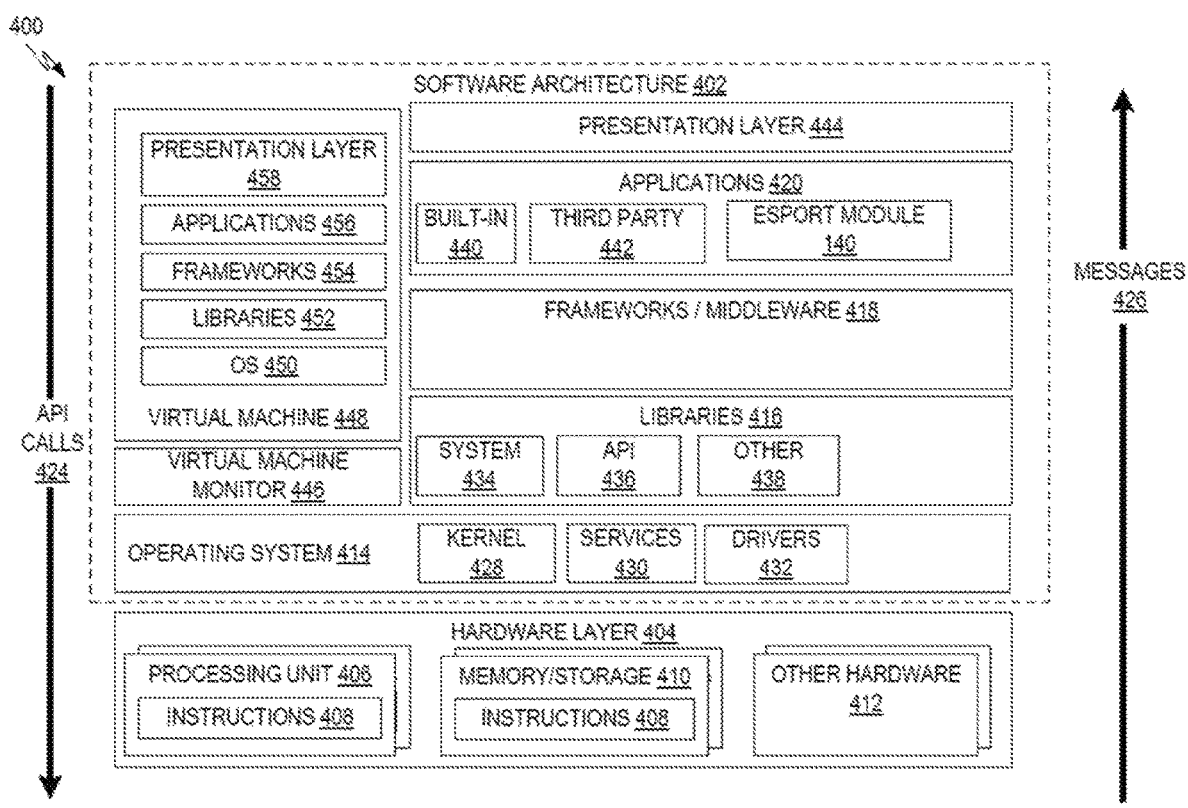
FIG. 6 is a block diagram illustrating an example software architecture, which may be used in conjunction with various hardware architectures described herein.

FIG. 6 is a block diagram illustrating an example software architecture 402, which may be used in conjunction with various hardware architectures herein described. FIG. 6 is a non-limiting example of a software architecture and it will be appreciated that many other architectures may be implemented to facilitate the functionality described herein. The software architecture 402 may execute on hardware such as machine 500 of FIG. 7 that includes, among other things, processors 510, memory 530, and input/output (I/O) components 550. A representative hardware layer 404 is illustrated and can represent, for example, the machine 500 of FIG. 7. The representative hardware layer 404 includes a processing unit 406 having associated executable instructions 408. The executable instructions 408 represent the executable instructions of the software architecture 402, including implementation of the methods, modules and so forth described herein. The hardware layer 404 also includes memory and/or storage modules shown as memory/storage 410, which also have the executable instructions 408. The hardware layer 404 may also comprise other hardware 412.

In the example architecture of FIG. 6, the software architecture 402 may be conceptualized as a stack of layers where each layer provides particular functionality. For example, the software architecture 402 may include layers such as an operating system 414, libraries 416, frameworks or middleware 418, applications 420 and a presentation layer 444. Operationally, the applications 420 and/or other components within the layers may invoke application programming interface (API) calls 424 through the software stack and receive a response as messages 426. The layers illustrated are representative in nature and not all software architectures have all layers. For example, some mobile or special purpose operating systems may not provide the frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be used by the applications 420 and/or other components and/or layers. The libraries 416 typically provide functionality that allows other software modules to perform tasks in an easier fashion than by interfacing directly with the underlying operating system 414 functionality (e.g., kernel 428, services 430, and/or drivers 432). The libraries 416 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) provide a higher-level common infrastructure that may be used by the applications 420 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be used by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. The third-party applications 442 may include an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 442 may invoke the API calls 424 provided by the mobile operating system such as the operating system 414 to facilitate functionality described herein.

The applications 420 may use built-in operating system functions (e.g., kernel 428, services 430, and/or drivers 432), libraries 416, or frameworks/middleware 418 to create user interfaces to interact with users of the system. Alternatively, or additionally, in some systems interactions with a user may occur through a presentation layer, such as the presentation layer 444. In these systems, the application/module "logic" can be separated from the aspects of the application/module that interact with a user.

Some software architectures use virtual machines. In the example of FIG. 6, this is illustrated by a virtual machine 448. The virtual machine 448 creates a software environment where applications/modules can execute as if they were executing on a hardware machine (such as the machine 500 of FIG. 6, for example). The virtual machine 448 is casted by a caster operating system (e.g., operating system 414 in FIG. 6) and typically, although not always, has a virtual machine monitor 446, which manages the operation of the virtual machine 448 as well as the interface with the caster operating system (e.g., operating system 414). A software architecture executes within the virtual machine 448 such as an operating system (OS) 450, libraries 452, frameworks 454, applications 456, and/or a presentation layer 458. These layers of software architecture executing within the virtual machine 448 can be the same as corresponding layers previously described or may be different.

Figure 7:
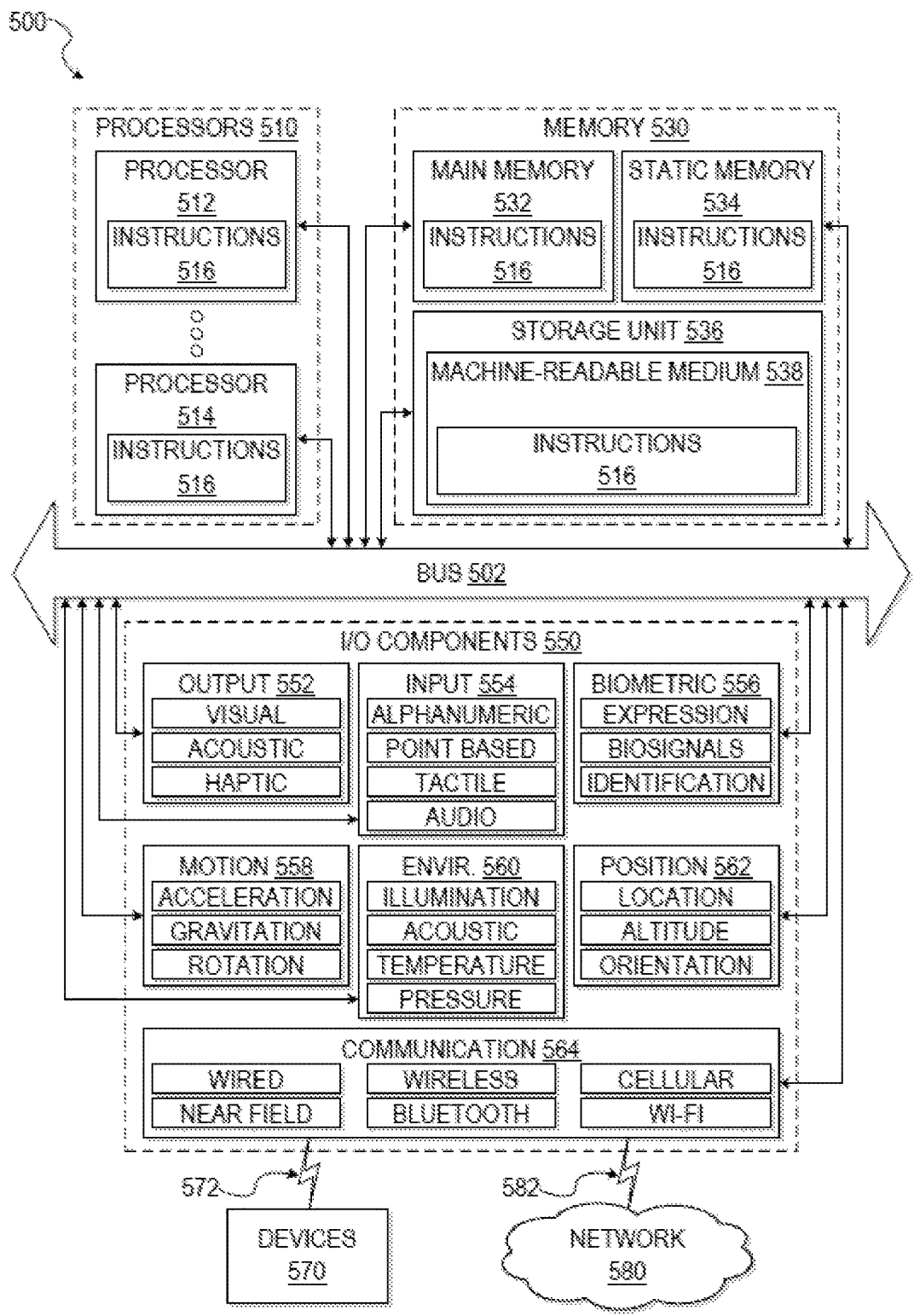
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 500, according to some example embodiments, able to read instructions from a machine-readable medium (e.g., a machine-readable storage medium) and perform any one or more of the methodologies discussed herein. Specifically, FIG. 7 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. As such, the instructions 516 may be used to implement modules or components described herein. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that may execute the instructions 516. The term "processor" is intended to include multi-core processor that may comprise two or more independent processors (sometimes referred to as "cores") that may execute instructions contemporaneously. Although FIG. 7 shows multiple processors, the machine 500 may include a single processor with a single core, a single processor with multiple cores (e.g., a multi-core processor), multiple processors with a single core, multiple processors with multiples cores, or any combination thereof.

The memory 530 may include a memory, such as a main memory 532, a static memory 534, or other memory storage, and a storage unit 536, both accessible to the processors 510 such as via the bus 502. The storage unit 536 and memory 532, 534 store the instructions 516 embodying any one or more of the methodologies or functions described herein. The instructions 516 may also reside, completely or partially, within the memory 532, 534, within the storage unit 536, within at least one of the processors 510 (e.g., within the processor's cache memory), or any suitable combination thereof, during execution thereof by the machine 500. Accordingly, the memory 532, 534, the storage unit 536, and the memory of processors 510 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific input/output (I/O) components 550 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 550 may include many other components that are not shown in FIG. 7. The input/output (I/O) components 550 are grouped according to functionality merely for simplifying the following discussion and the grouping is in no way limiting. In various example embodiments, the input/output (I/O) components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 550 may include biometric components 556, motion components 558, environment components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental environment components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 550 may include communication components 564 operable to couple the machine 500 to a network 580 or devices 570 via a coupling 582 and a coupling 572 respectively. For example, the communication components 564 may include a network interface component or other suitable device to interface with the network 580. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:
1. A system comprising:
   a first mobile device having one or more hardware processors, a first mobile-device memory, and a first set of sensors, the first set of sensors including a digital camera device configured to capture digital video and including sensors to track 6 degree of freedom position and orientation of the first device; and
   a second mobile device having one or more additional hardware processors, a second mobile-device memory, and a second set of sensors including sensors to track 6 degree of freedom position and orientation of the second device;
   wherein a first MR window module is included in the first mobile-device memory to configure the one or more hardware processors to perform operations for generating and synchronizing digital content between the first mobile device and the second mobile device, the operations comprising:

receiving, via an application executing within an operating system of the first mobile device, 6 degree of freedom device position and orientation data from the operating system of the first mobile device and the first set of sensors;

using sensor data from the operating system of the first mobile device to determine at least two 3D points associated with two physical locations corresponding to the second mobile device;

comparing coordinates of at least two 3D points associated with two physical locations on the first mobile device to the at least two 3D points associated with the two physical locations corresponding to the second mobile device to determine an offset for the position, orientation and scale of the first mobile device relative to the second mobile device;

sharing the offset and digital content data generated or captured by the first mobile device over a network with a second application executing in an operating system of the second mobile device;

wherein a second MR window module is included in the second mobile-device memory to configure the additional one or more hardware processors to use the offset to align the digital content generated or captured by the first mobile device with digital content data generated or captured by the second mobile device on a device display of the second mobile device.

2. The system of claim 1, wherein the offset is a transformation matrix that includes translation, rotation and scaling to convert coordinates from the first mobile device to coordinates of the second mobile device.

3. The system of claim 1, wherein the using of the sensor data to determine the at least two 3D points includes using tracked handheld controllers placed in proximity to the second mobile device.

4. The system of claim 1, wherein the using sensor data to determine at least two 3D points includes using computer vision methods on image data captured by the digital camera.

5. The system of claim 1, wherein the first mobile device and the second mobile device are augmented reality devices, and the at least two 3D points are associated with two real-world 3D point locations; and the additional one or more hardware processors are further configured to:

use sensor data from the operating system of the second mobile device to determine the same two real-world 3D points; and use the at least two 3D points from the first mobile device and the at least two 3D points from the second mobile device to determine an offset for the position and orientation of the first mobile device relative to the second mobile device.

6. A method comprising:

performing operations for synchronizing digital content between a first mobile device and a second mobile device, the first mobile device having one or more hardware processors, a first mobile-device memory, and a first set of sensors, the first set of sensors including a digital camera device configured to capture digital video and including sensors to track 6 degree of freedom position and orientation of the first device, the second mobile device having one or more additional hardware processors, a second mobile-device memory, and a second set of sensors, the second set of sensors including sensors to track 6 degree of freedom position and orientation of the second device the operations comprising:

receiving via an application executing within an operating system of a first mobile device, 6 degree of freedom device position and orientation data from the operating system of the first mobile device and the first set of sensors;

using sensor data from the operating system of the first mobile device to determine at least two 3D points associated with two physical locations on the second mobile device;

comparing coordinates of at least two 3D points associated with two physical locations on the first mobile device to the at least two 3D points associated with the two physical locations on the second mobile device to determine an offset for the position, orientation and scale of the first mobile device relative to the second mobile device;

sharing the offset and digital content data captured by the first mobile device over a network with a second application executing in an operating system of the second mobile device, wherein the second mobile device is configured to use the offset to align the digital content captured by the first mobile device with digital content data captured by the second mobile device on a device display of the second mobile device.

7. The method of claim 6, wherein the offset is a transformation matrix that converts coordinates from the first mobile device to coordinates of the second mobile device.

8. The method of claim 6, wherein the using of the sensor data to determine the at least two 3D points includes using tracked handheld controllers placed in proximity to the second mobile device.

9. The method of claim 6, wherein the using sensor data to determine at least two 3D points includes using computer vision methods on image data captured by the digital camera.

10. The method of claim 6, wherein the one or more hardware processors are configured to perform the operations for synchronizing the digital content by a first MR window module that is included the first mobile-device memory.

11. The method of claim 6, wherein the additional one or more hardware processors are configured to use the offset to display the digital content by inclusion of a second MR window module in the second mobile-device memory.

12. The method of claim 6, wherein the first mobile device and the second mobile device are augmented reality devices, and the at least two 3D points are associated with two real-world 3D point locations; and the second mobile device is further configured to:

use sensor data from the operating system of the second mobile device to determine the same two real-world 3D points; and use the at least two 3D points from the first mobile device and the at least two 3D points from the second mobile device to determine an offset for the position and orientation of the first mobile device relative to the second mobile device.

13. A non-transitory machine-readable medium having a set of instructions stored thereon, which, when executed by one or more computer processors, causes the one or more computer processors to perform operations for synchronizing digital content between a first mobile device and a second mobile device, the operations comprising:

receiving via an application executing within an operating system of the first mobile device, device position and orientation data from the operating system of the first mobile device and a first set of sensors of the first mobile device, the first set of sensors including sensors to track 6 degree of freedom position and orientation of the first device;

using sensor data from the operating system of the first mobile device to determine at least two 3 points associated with two physical locations on the second mobile device;

comparing coordinates of at least two 3points associated with two physical locations on the first mobile device to the at least two 3D points associated with the two physical locations on the second mobile device to determine an offset for the position, orientation, and scale of the first mobile device relative to the second mobile device;

sharing the offset and digital content data captured by the first mobile device over a network with a second application executing in an operating system of the second mobile device, wherein the second mobile device is configured to use the offset to align the digital content captured by the first mobile device with digital content data captured by the second mobile device on a device display of the second mobile device.

14. The non-transitory machine-readable medium of claim 13, wherein the offset is a transformation matrix that converts coordinates from the first mobile device to coordinates of the second mobile device.

15. The non-transitory machine-readable medium of claim 13, wherein the using of the sensor data to determine the at least two 3D points includes using tracked handheld controllers placed in proximity to the second mobile device.

16. The non-transitory machine-readable medium of claim 13, wherein the using sensor data to determine at least two 3D points includes using computer vision methods on image data captured by the digital camera.

17. The non-transitory machine-readable medium of claim 13, wherein the digital content captured by the first mobile device is associated with an augmented reality session or a virtual reality session.

18. The non-transitory machine-readable medium of claim 13, wherein the one or more hardware processors are configured to perform the operations for synchronizing the digital content by a first MR window module that is included the first mobile-device memory.

19. The non-transitory machine-readable medium of claim 13, wherein the additional one or more hardware processors are configured to use the offset to display the digital content by inclusion of a second MR window module in the second mobile-device memory.

20. The non-transitory machine-readable medium of claim 13, wherein the first mobile device and the second mobile device are augmented reality devices, and the at least two 3D points are associated with two real-world 3D point locations; and the second mobile device is further configured to:

use sensor data from the operating system of the second mobile device to determine the same two real-world 3D points; and use the at least two 3D points from the first mobile device and the at least two 3D points from the second mobile device to determine an offset for the position and orientation of the first mobile device relative to the second mobile device.

21. The system of claim 1, wherein the using of the offset to display the digital content generated or captured by the first mobile device together with digital content data generated or captured by the second mobile device on a device display of the second mobile device includes aligning the digital content data generated or captured by the second device with the digital content data generated or captured by the first mobile device.

22. The system of claim 1, wherein the using of the sensor data from the operating system of the first mobile device to determine the at least two 3D points associated with the two physical locations on the second mobile device includes receiving a selection of the at least two 3D points associated with the two physical locations on the second mobile device from a user interface of the second mobile device, the selection corresponding to a selection of the at least two 3D points associated with the two physical locations on the first mobile device from a user interface of the first mobile device.

* * * * *

UNITED STATES PATENT AND TRADEMARK OFFICE
CERTIFICATE OF CORRECTION

PATENT NO. : 11,132,842 B2  
APPLICATION NO. : 16/231064  
DATED : September 28, 2021  
INVENTOR(S) : Forbes et al.

Page 1 of 1

It is certified that error appears in the above-identified patent and that said Letters Patent is hereby corrected as shown below:

In the Claims

In Column 17, Line 28, in Claim 1, delete "align" and insert --align, in substantially real time,-- therefor In Column 18, Line 25, in Claim 6, delete "align" and insert --align, in substantially real time,-- therefor In Column 19, Line 9, in Claim 13, delete "3" and insert --3D-- therefor In Column 19, Line 12, in Claim 13, delete "3points" and insert --3D points-- therefor In Column 19, Line 23, in Claim 13, delete "align" and insert --align, in substantially real time,-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*